United States Patent
Schenk (10) Patent No.: US 8,204,100 B2
(45) Date of Patent: Jun. 19, 2012

(54) METHODS AND APPARATUSES FOR DATA TRANSMISSION

(75) Inventor: Heinrich Schenk, Munich (DE)

(73) Assignee: Lantiq Deutschland GmbH, Neubiberg (DE)

( * ) Notice: Subject to any disclaimer, the term of this patent is extended or adjusted under 35 U.S.C. 154(b) by 655 days.

(21) Appl. No.: 12/354,298

(22) Filed: Jan. 15, 2009

(65) Prior Publication Data

US 2010/0177838 A1    Jul. 15, 2010

(51) Int. Cl.
H04L 5/16    (2006.01)

(52) U.S. Cl. ........ 375/222; 375/219; 375/220; 375/257; 375/285; 375/296; 455/39; 455/63.1; 455/69; 455/73; 455/114.3; 455/522; 370/272; 370/273; 370/276; 370/297; 370/201; 370/334; 370/335; 330/149

(58) Field of Classification Search .......... 375/219, 375/220, 222, 257, 285, 296; 455/39, 63.1, 455/69, 73, 114.3, 522; 370/272, 273, 276, 370/297, 201, 334, 335; 330/149
See application file for complete search history.

(56) References Cited

U.S. PATENT DOCUMENTS

| 5,479,447 | A | 12/1995 | Chow et al. | |
|---|---|---|---|---|
| 2004/0095921 | A1 | 5/2004 | Kerpez | |
| 2005/0271127 | A1 | 12/2005 | Cassiers et al. | |
| 2006/0280237 | A1* | 12/2006 | Rhee et al. | 375/222 |
| 2008/0253401 | A1* | 10/2008 | Thyagarajan et al. | 370/485 |
| 2008/0285510 | A1* | 11/2008 | Thyagarajan et al. | 370/329 |
| 2009/0046568 | A1* | 2/2009 | Xu | 370/201 |

FOREIGN PATENT DOCUMENTS

WO    2007/066907 A1    6/2007

OTHER PUBLICATIONS

Yu, W. et al. "Distributed Multiuser Power Control for Digital Subscriber Lines." IEEE Journal on Selected Areas in Communications, vol. 20, No. 5, Jun. 2002, pp. 1105-1115.
Cendrillon, R. et al. "Optimal Multi-user Spectrum Balancing for Digital Subscriber Lines." IEEE Transactions on Communications, vol. 54, Issue 5, May 2006.
European Telecommunications Standards Institute. "ETSI TS 101 270-1, V1.4.1 (Jun. 2005): Transmission and Multiplexing (TM); Access transmission systems on metallic access cables; Very high speed Digital Subscriber Line (VDSL); Part 1: Functional requirements." Jun. 2005.
Schenk, H. et al. "Methods and Apparatuses for Data Transmission." Co-pending U.S. Appl. No. 12/195,602, filed Aug. 21, 2008.

(Continued)

*Primary Examiner* — Leon Flores
(74) *Attorney, Agent, or Firm* — Murphy, Bilak & Homiller, PLLC (57) ABSTRACT

According to an embodiment of a communication device, the communication device includes communication circuitry configured to communicate via a plurality of transmission channels. The communication circuitry includes crosstalk reduction circuitry to reduce crosstalk for a part of the plurality of transmission channels by joint processing of data of the part of the transmission channels. This part is selected from the plurality of transmission channels depending on a grouping of the transmission channels into at least two groups. Each of the at least two groups is assigned a target bit rate. The target bit rate differs for different groups.

25 Claims, 5 Drawing Sheets

OTHER PUBLICATIONS

Verlinden, J. "Crosstalk Channel Model: Text Proposal." NIPP-NAI-2008-010R1. Network Interface, Power and Protection (NIPP); Network Access Interfaces (NAI) Subcommittee; Vancouver, Canada, Jan. 21-25, 2008.

Author Unknown. "Draft Dynamic Spectrum Management Technical Report." NIPP-NAI-2007-038R3 Draft, Dynamic Spectrum Management TR; NIPP-NAI; Minneapolis, MN, May 14-17, 2007.

Cendrillon R. et al., "Partial Crosstalk Precompensation in Downstream VDSL", Signal Processing, Elsevier Science Publishers B.V., Amsterdam, NL LNKD_DIO: 10.1016/J. SIGPRO. 2004.07.013, vol. 84, No. 11, Nov. 1, 2004, pp. 2005-2019, XP004591296.

Cendrillon R. et al., "Partial Crosstalk Cancellation for Upstream VDSL", EURASIP Journal of Applied Signal Processing, Hindawi Publishing Co., Cuyahoga Falls, OH, US LNKD-DOI: 10.1155/S1110865704309273, vol. 2004, No. 10, Aug. 15, 2004, pp. 1520-1535, XP002456935.

International Search Report mailed Jul. 9, 2010 re International Application No. PCT/EP2010/050442 filed Jan. 15, 2010.

* cited by examiner

METHODS AND APPARATUSES FOR DATA TRANSMISSION

BACKGROUND

So-called vectoring or vectored data transmission is a technique for coordinated transmission or reception of data from a plurality of transmitters to a plurality of receivers via a plurality of transmission channels in order to improve the transmission, for example to reduce the influence of crosstalk. Either transmitters or receivers are co-located. Vectoring is sometimes also referred to as Spectrum Management Level 3.

For example, in DSL (digital subscriber line) transmission systems, for example VDSL (very high bit rate DSL) transmission systems, data may be transmitted from a central office (CO) or other provider equipment to a plurality of receivers located in different locations, for example in customer premises (CPE), via a plurality of communication lines. Crosstalk resulting from signals on different lines transmitted in the same direction, also referred to as far end crosstalk (FEXT), may result in a reduced data throughput. Through vectoring, signals transmitted over the plurality of communication lines from the central office or received via the plurality of communication lines in the central office may be processed jointly in order to reduce such crosstalk, which joint processing corresponds to the above-mentioned vectoring. In this respect, the reduction of crosstalk by coordinated transmission of signals is sometimes referred to as crosstalk precompensation, whereas the reduction of crosstalk through joint processing of the received signals is sometimes referred to as crosstalk cancellation. The communication lines which are processed jointly are sometimes referred to as vectored group.

For this kind of crosstalk reduction, for example in an initialization phase of the data transmission system or during operation of the data transmission system, parameter describing the crosstalk between the communication connections are obtained and the crosstalk reduction is performed based on these parameters.

The computational effort of this crosstalk reduction increases with increasing number of transmission channels, for example communication lines, involved. Therefore, in transmission systems involving a large number of transmission channels, sometimes so-called partial vectoring is used, where only a part of the transmission channels are subjected to vectoring. In this case, a selection has to be made which transmission channels or which crosstalk paths add to the vectored group.

Another possible approach to reduce crosstalk in communication systems is so-called spectrum balancing, also sometimes referred to as Spectrum Management Level 2. In this approach, transmission powers for the individual transmission channels are controlled to reduce the effect of crosstalk at least for some transmission channels.

SUMMARY

According to some embodiments of the present invention, a plurality of transmission channels is grouped into at least two groups, and a part of transmission channels is selected from said plurality of transmission channels for crosstalk reduction depending on said grouping.

In other embodiments, other features and/or alternative features may be implemented.

DETAILED DESCRIPTION OF THE INVENTION

In the following, some embodiments of the present invention will be described in detail. It is to be understood that the following description is given only for the purpose of illustration and is not to be taken in a limiting sense. The scope of the invention is not intended to be limited by the embodiments described hereinafter with reference to the accompanying drawings, but is to be intended only to be limited by the appended claims and equivalents thereof.

It is also to be understood that in the following description of embodiments any direct connection or coupling between functional blocks, devices, components, circuit elements or other physical or functional units shown in the drawings or described herein, i.e. any connection without intervening elements could also be implemented by an indirect connection or coupling, i.e. a connection or coupling with one or more intervening elements. Furthermore, it should appreciated that functional blocks or units shown in the drawings may be implemented as separate circuits in embodiments, but may also be fully or partially implemented in a common circuit in other embodiments. It is further to be understood that any connection which is described as being wire-based in the following specification may also be implemented as a wireless communication unless noted to the contrary.

It should be noted that the drawings are provided to give an illustration of some aspects of embodiments of the present invention and therefore are to be regarded as schematic only. In particular, the elements shown in the drawings are not necessary to scale with each other, and the placement of various elements in the drawings is chosen to provide a clear understanding of the respective embodiment and is not to be construed as necessarily being a representation of the actual relative locations of the various components in implementations according to an embodiment of the invention.

It is to be noted that describing an embodiment comprising a plurality of features is not to be construed as indicating that all these features are necessary for practicing the present invention. Instead, in other embodiments, some features may be omitted, replaced by different features and/or additional features may be present.

The features of the various embodiments described herein may be combined with each other unless specifically noted otherwise.

The term "transmission channel" as used herein is intended to refer to any kind of transmission channel including wire-based transmission channels like a copper line or a pair of copper lines and wireless transmission channels.

The term "sub-channel" as used herein is intended to refer to a sub-channel on a transmission channel, wherein on a single transmission channel a plurality of sub-channels may be present. For example, in DSL communication on a single wireline data is transmitted on a plurality of carriers having different frequencies, these carriers also being referred to as "tones". Such carriers or tones are examples for sub-channels for the case of DSL data transmission. Another example for a sub-channel is a logic channel which may be used for transmitting specific kinds of data, for example control information, wherein such a logic channel may use one or more of the above-mentioned carriers or tones in DSL communication.

Figure 1:
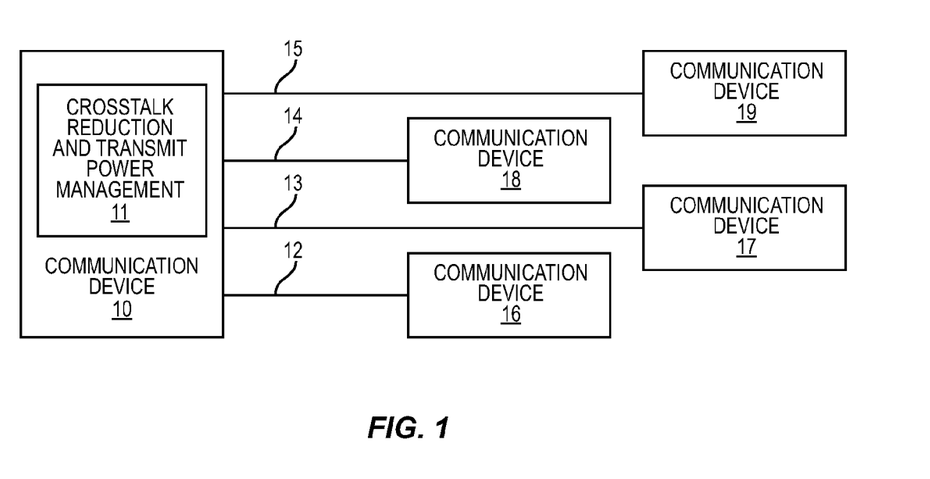
FIG. 1 shows a block diagram illustrating a basic structure of a communication system according to an embodiment of the present invention.

Turning now to the Figures, in a communication system shown in FIG. 1, a communication device 10 communicates with communication devices 16, 17, 18 and 19 via respective transmission channels 12, 13, 14 and 15. While in FIG. 1 four communication devices 16, 17, 18 and 19 are shown, in other embodiments any suitable other number of communication devices may also be provided.

In an embodiment, the communication via transmission channels 12, 13, 14 and 15 is a bidirectional communication. In such an embodiment, communication device 10 may comprise a transceiver for each of the transmission channels 12, 13, 14 and 15, and each communication device 16, 17, 18 and 19 also may comprise a transceiver. In another embodiment, all or some of transmission channels 12, 13, 14 and 15 may be unidirectional transmission channels. In another embodiment, all or some of the communication devices 16, 17, 18, 19 might be co-located.

In the embodiment of FIG. 1, couplings between the transmission channels 12-15 may cause so-called far-end crosstalk (FEXT), for example if some or all of the transmission channels are wirelines running close to each other. Through at least partial joint processing of the signals transmitted from communication device 10 to communication device 16, 17, 18 and 19 and/or through at least partial joint processing of signals received from communication devices 16, 17, 18 and 19 at communication device 10 in a crosstalk reduction unit 11, the influence of such crosstalk may be reduced. As already mentioned, the joint processing for crosstalk reduction is also referred to as vectoring, and the transmission channels which are subjected to such a crosstalk reduction are also referred to as vectored group.

In the following, the transmission direction from communication device 10 to communication devices 16, 17, 18 and 19 will be referred to as downstream direction, and the opposite transmission direction from communication devices 16, 17, 18 and 19 to communication device 10 will be referred to as upstream direction. Reduction of crosstalk in the downstream direction is also referred to as crosstalk precompensation since the signals transmitted are modified before transmission, i.e. before the actual crosstalk occurs, whereas the reduction of crosstalk in the upstream direction is also referred to as crosstalk cancellation as here through joint processing in crosstalk reduction unit 11 the crosstalk is reduced or cancelled after it has occurred.

In embodiments, crosstalk cancellation may for example be performed by calculating received signals for each transmission channel depending on a linear combination of all received signals on all transmission channels of the vectored group, and crosstalk precompensation may be performed by calculating signals to be transmitted via each transmission channel depending on a linear combination of signals to be transmitted on all transmission channels. However, other calculation methods, for example non-linear calculations, are also possible.

In order to perform such a crosstalk reduction, i.e. the vectoring, the crosstalk reduction unit 11 has to be "trained", i.e. the crosstalk reduction unit 11 needs information regarding the actual crosstalk occurring between the transmission channels in the vectored group. This may for example be achieved by transmitting predetermined training signals, for example pilot signals, via the transmission channels and analyzing the received signals to determine the crosstalk. In embodiments, data transmission via the transmission channels comprises the transmission of pilot signals or symbols, wherein between the pilot signals other data like payload data may be transmitted. In an embodiment, the pilot signals or modified pilot signals are used for training crosstalk reduction unit 11. In an embodiment, synchronization signals or synchronization symbols may be used as pilot signals. However, other training signals may also be used.

In an embodiment, some or all of the transmission channels 12-15 of FIG. 1 comprise a plurality of sub-channels.

It should be noted that in some cases sub-channels used for the downstream direction will be different from sub-channels used for the upstream direction. For example, in DSL communication the sub-channels for the downstream direction may use (a) different frequency range(s) than the sub-channels in the upstream direction.

In such embodiments, for training in the downstream direction communication device 10 may transmit the above-mentioned training signals on some or all sub-channels of communication lines 12 to 15 to communication devices 16 to 19. Communication devices 16 to 19 then return error signals indicative of a deviation between the received training signals and the sent training signals back to communication device 10. Based on these error signals, crosstalk reduction unit 11 calculates first crosstalk reduction parameters for the downstream direction, which may also be referred to as crosstalk precompensation parameters or crosstalk precompensation coefficients. The error signals constitute crosstalk information indicative of the crosstalk occurring between the sub-channels of the communication channels 12 to 15. A similar approach may be made for the upstream direction.

In an embodiment, only some of the transmission channels connected to communication device 10 are subjected to vectoring. This is also referred to as partial vectoring. A reason may for example be the computational complexity involved. For example, if 1,000 transmission channels are coupled with communication device 10, performing a complete vectoring of these 1,000 transmission channels may in some cases exceed the computational capabilities of processors or other equipment used for vectoring involved. Therefore, in such cases partial vectoring with only some of the transmission channels may be performed.

In such an embodiment, a selection is made with which of the plurality of transmission channels present the vectoring is to be performed. It should be noted that this selection need not be the same for upstream and downstream direction. The transmission channels which are involved in the vectoring are also referred to as vectored group in the following.

In an embodiment, different transmission channels may lead to different communication devices, for example to communication devices 16 to 19 of FIG. 1, of customers having different contracts with a provider of a communication service via for example communication device 10. For example, different maximum data rates may be agreed upon in indifferent contracts. In other embodiments, other criteria may be used to distinguish between transmission channels.

Based on such criteria, in an embodiment weighting coefficients or weighting factors are provided for the plurality of transmission channels coupled with communication device 10. The weighting coefficients in an embodiment reflect the relative "importance" of the transmission channels. For example, a transmission channel with a higher intended maximum data rate may have a higher weighting coefficient than a transmission channel with a lower intended maximum data rate.

In an embodiment, the selection which transmission channels to include in the vectored group is made depending on these weighting coefficients. Additionally, the selection may be made depending on the strength of the crosstalk between the transmission channels.

In the following, some of the above concepts will be further illustrated using further embodiments. As an example for an environment for implementing the present invention, these embodiments DSL (digital subscriber line) systems like VDSL (very high bit rate DSL) systems are used.

In DSL systems, generally wire-based communication lines are used as transmission channels, for example pairs of copper lines, and on each communication lines data is modulated onto a plurality of carrier or tones, i.e. different frequency sub-channels. However, it is to be noted that in other embodiments other kinds of communication systems including wireless communication systems may be used.

Figure 2:
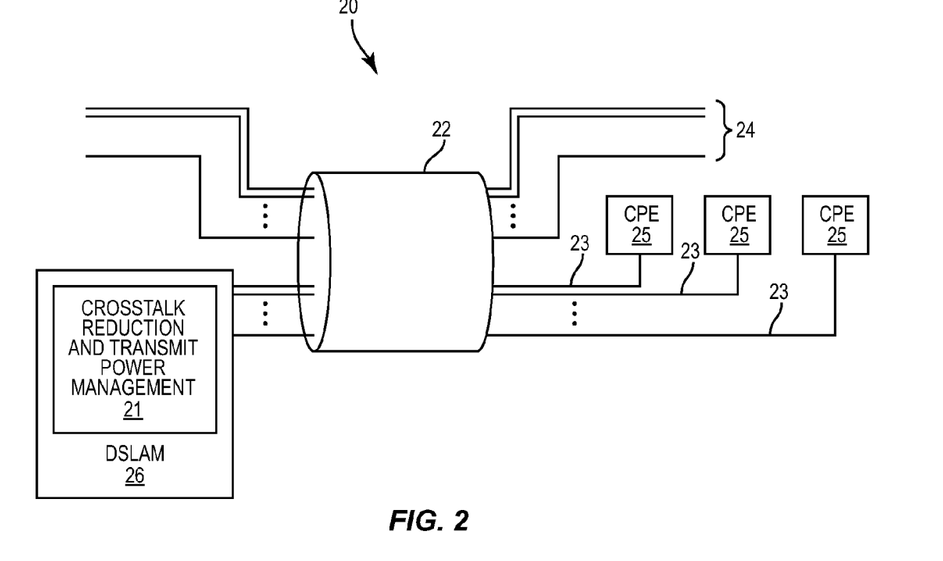
FIG. 2 shows a block diagram illustrating some features of a communication system according to an embodiment of the present invention.

A DSL communication systems 20 shown in FIG. 2 comprises a plurality of so-called subscribers 25. The equipment of subscribers 25 is sometimes also referred to as customers premises equipment and may for example comprise DSL modems for connecting personal computers or other equipment with a so-called central office of a service provider.

In the Communication system 20 of FIG. 2, each of the subscribers 25 is coupled to a central office equipment 26 via a respective transmission channel in the form of a communication line 23. In the example of FIG. 2, the central office equipment 26 is a DSLAM (digital subscriber line access multiplexer). In the embodiment of FIG. 2, DSLAM 26 comprises a crosstalk reduction and transmit power management unit 21 which controls vectoring or partial vectoring of communication lines 23 by crosstalk cancellation or crosstalk precompensation (so-called Spectrum Management Level 3) and to perform a power management, i.e. to adjust the transmit power used by a different ones of communication lines 23 (Spectrum Management Level 2).

The DSLAM 26 comprises a plurality of transmission ports, each coupled to a respective communication line 23. It should be noted while in the embodiment of FIG. 2 crosstalk reduction and transmit power management unit 21 is located within DSLAM 26, in other embodiments unit 21 may be a unit external to DSLAM 26.

In the embodiment shown, the communication lines are bundled in a single cable binder 22. Such bundling in a cable binder generally increases the likelihood of crosstalk, for example far-end crosstalk, occurring between communication lines 23. However, in other embodiments some or all of communication lines 23 need not be in a common cable binder.

As illustrated in FIG. 2, the cable binder 22 may also comprise additional communication lines 24 which are not used by the DSL communication system 20, for example analog telephone lines.

It should be noted that the communication lines 23 may have different lengths, which is typical for a situation in which the individual subscribers 25 are located at different positions. However, some or all of communication lines 23 may also have the same length.

The crosstalk reduction and transmit power management unit 21 may control crosstalk reduction and the transmit power on the individual lines both for the downstream direction, i.e., the transmission direction from DSLAM 26 to subscribers 25, and in the upstream direction, i.e., in the direction from subscribers 25 to DSLAM 26.

Figure 3:
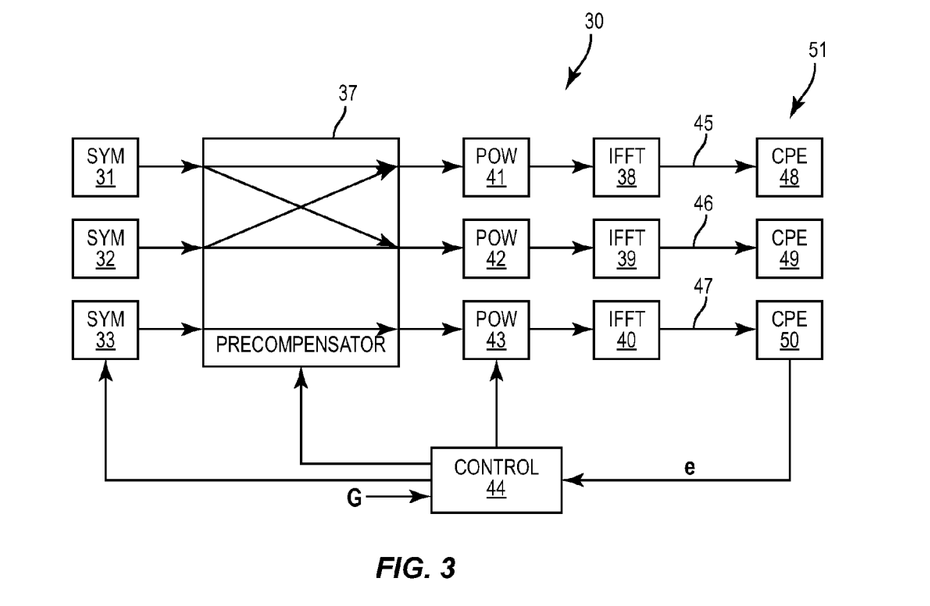
FIG. 3 shows a block diagram illustrating some features of communication devices according to some embodiments of the present invention.

In order to illustrate this, in FIG. 3 some components of a central office equipment 30 according to an embodiment are schematically shown in FIG. 3. Central office equipment 30 may for example be incorporated in DSLAM 26 of FIG. 2.

Central office equipment 30 shows some components used for transmitting data in the downstream direction over a plurality of communication lines 45, 46, 47. While three communication lines are shown as an example in FIG. 3, any number of communication lines may be present, for example 1,000 communication lines or more.

Via communication lines 45, 46 and 47 communication device 30 is linked to subscribers 48, 49, 50, the subscriber end of the communication lines being generally labelled 51 in the FIG. 3.

In device 30 of the embodiment of FIG. 30, symbol mappers 31, 32 and 33 map data, for example payload or training data, onto carrier constellations, i.e., a plurality of carriers or tones each carrier having its own frequency range, or, in other words, a plurality of sub-channels. Said data is to be transmitted via communication lines 45, 46, 47 to the respective subscribers 48, 49 and 50. A crosstalk precompensator 37 which is an example for crosstalk reduction circuitry modifies some or all of these symbol mappings in order to precompensate crosstalk occurring during the transmission via communication lines 45, 46, 47. In particular, in the embodiment of FIG. 3 crosstalk precompensator 37 performs a so-called partial vectoring, i.e., only for some of the communication lines involved vectoring is performed. For example, as indicated by arrows within precompensator 37 of FIG. 3, in the example illustrated a partial vectoring is performed for communication lines 45 and 46, i.e., communication lines 45 and 46 form a vectored group, while no vectoring is performed for communication line 47. This is only to be seen as an example and criteria for choosing which communication lines to add to a vectored group and corresponding methods which may be implemented in control 44 which controls which communication lines are added to the vectored group will be explained further below.

For example, for partial vectoring, the symbols output by the symbol mappers associated with the communication lines of the vectored group, in the example shown symbol mappers 31 and 32, may be seen as a vector which is multiplied with a matrix comprising crosstalk precompensation coefficients. In other words, the symbols output by precompensator 37 are, for the communication lines of the vectored group, linear combinations of the symbol input to precompensator 37 for the vectored group, where the crosstalk precompensation coefficients are chosen such that the effect of crosstalk between the communication line of the vectored group is precompensated. With the above method, far-end crosstalk between the vectored lines may be reduced or cancelled altogether. In other embodiments, instead of simply selecting communication lines to be added to the vectored group, certain FEXT branches may be added. A FEXT branch in this respect is a crosstalk path from a first transmission channel to a second transmission channel. For example, in the system of FIG. 3 for partial vectoring only crosstalk from communication line 47 to communication line 46 and from communication line 46 to communication line 45 may be cancelled, while other FEXT branches like from communication line 47 to communication line 45 are not added to the vectored group.

The carrier mappings modified by precompensator 37 are modulated onto the above mentioned plurality of carriers for each communication line. Power regulators 41, 42, 43 adjust transmit power levels of the individual carriers and therefore of the signal to be transmitted via communication lines 45, 46 and 47. The individual power levels of the carriers are controlled by control circuit 44 in the embodiment of FIG. 3. Power regulators 41, 42, 43 may e.g. be implemented in a digital signal processor which multiplies the mapped constellations with power adjustment factors. Then, the signals are transferred to signals in the time domain by inverse fast Fourier transformers 38, 39 and 40. Possibilities for such a control will be discussed later. It should be noted that while in the embodiment of FIG. 3 transmit power levels are adjusted individually for each carrier, in other embodiments, the transmit power may be adjusted globally for all carriers of a communication line, for example by controlling an amplifier (not shown) downstream of the respective transformer 38, 39, 40.

Generally, the number of bits which can be mapped onto each carrier in symbol mappers 31 to 33 depends on the signal to noise ratio (SNR) for the various carriers, which in turn depends both on the power level with which the signals are transmitted and on the amount of crosstalk. Therefore, pre-compensating crosstalk in precompensator 37 and/or increasing the transmission power used for the individual carrier may increase the number of bits which can be mapped onto the respective carrier of the respective communication lines and therefore increase the bit rate. On the other hand, increasing transmission power for some or all carriers on one line may increase the crosstalk from this line to other lines, thereby potentially lowering the possible bit rate for the other lines. The number of bits which are mapped onto the respective carriers in the embodiment of FIG. 3 is also controlled by control circuit 44.

In order for example to determine the crosstalk between the various lines and/or to determine precompensation coefficients to be used by precompensator 37, as already mentioned training sequences, i.e., known symbols, are sent via communication lines 45, 46 and 47, and an error signal e is sent back to control circuit 44 by subscribers 48, 49 and 50, the error signal e being indicative of deviations between the transmitted signals sent by device 30 via communication lines 45, 46, 47 and the symbols received by subscribers 48, 49, 50.

Furthermore, as an input control circuit 44 receives a weighting vector G indicating relative weights of the various communication lines. These weights may for example be depending on an intended or agreed upon bit rate for the communication lines.

As a simple example, for communication lines 45 and 46 a first bit rate may be intended, and for communication line 47 a second bit rate being a half of the first bit rate may be intended. In such a case, the weighting vector G may be set to be equal to (1,1,0.5) to indicate that communication line 47 has half the intended bit rate compared with communication lines 45 and 46.

Control circuit 44 then controls precompensator 37, amplifiers 41 to 43 and also symbol mappers 31 to 33 depending on the weighting vector G and the error signal e.

It should be noted that in FIG. 3 only some components of communication device 30 are depicted, and subscribers 48, 49 and 50 are depicted as simple blocks in order to simplify the explanations by showing only elements which are relevant for the understanding of the respective embodiment. Further components which are conventionally found in xDSL transmission systems may additionally be present, like encoders for Reed-Solomon coding or Tomlinson coding, serial/parallel and parallel/serial converters, and elements at subscribers 48, 49, 50 like fast Fourier transformers, filters, frequency equalizers or slicers.

Before examples for the operation of control circuit 44 will be described in more detail first an embodiment of a corresponding system and devices for operation in the upstream direction will be explained with reference to FIG. 4.

Figure 4:
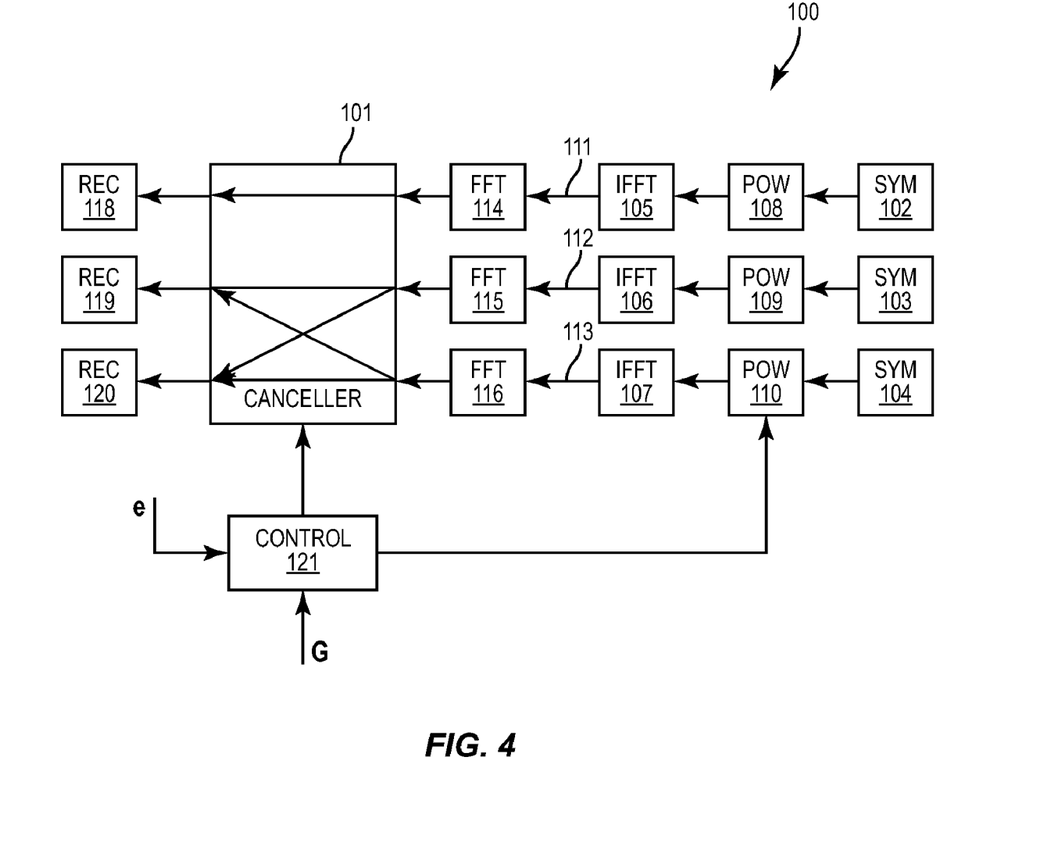
FIG. 4 shows a block diagram illustrating some features of communication devices according to some embodiments of the present invention.

In the embodiment of FIG. 4, subscribers on a subscriber side 100 transmit signals via communication lines 111, 112, 113 to central office equipment 101 which may, for example, be a DSLAM like DSLAM 26 of FIG. 2. It should be noted that for bidirectional communication systems, for example communication lines 111, 112 and 113 of the embodiment of FIG. 4, may be physically identical to communication lines 45, 46 and 47 of the embodiment of FIG. 3. In the embodiment of FIG. 4, for each subscriber a symbol mapper 102, 103 and 104, an inverse fast Fourier transformer 105 and 106 and 107 and power regulators 108, 109 and 110, respectively, perform substantially the same functions and symbol mappers 31, 32, 33, inverse fast Fourier transformer 38, 39 and 40 and power regulators 41, 42 and 43 in communication device 30 of the embodiment of FIG. 3, with the exception that no crosstalk precompensator is provided. In other words, for each communication line a respective symbol mapper 102, 103 and 104 maps data onto a plurality of carriers, the data is then modulated onto the carriers. The transmit power of the individual carriers is adjusted via power regulators 108, 109 and 110. The data is further transformed into the time domain by inverse fast Fourier transformers 105, 106 and 107 and transmitted via communication lines 111, 112 and 113. In case of bidirectional communication, the carriers, i.e., frequency ranges, used for the upstream direction may be different from the carriers used for the downstream direction. Similar to the downstream direction, the transmit power may additionally or alternatively be adjusted for all carriers of a communication line e.g. via an amplifier downstream of transformers 105, 106, 107.

Power regulators 108, 109 and 110 are controlled by a control circuit 121. Control circuit 121 in the embodiment of FIG. 4 is located in communication device 101 on the central office side and may send control signals to amplifiers 108, 109 and 110 for example via a special logic channel on communication lines 111, 112 and 113, for example an overhead channel.

In communication device 101, received data is transferred to the frequency domain via fast Fourier transformers 114, 115 and 116 and then fed to a crosstalk canceller 117 which in the embodiment of FIG. 4 is configured to perform a partial vectoring for some of communication lines 111, 112, 113. For example, in the situation shown in FIG. 4 communication lines 112, 113 form a vectored group and symbols output by crosstalk canceller 101 for these two lines are a linear combination of symbols received via these lines, similar to what has explained for crosstalk precompensator 37. For example, the received symbols for the vectored group may be written as a vector and multiplied with a matrix comprising crosstalk cancellation coefficients. The crosstalk cancellation in crosstalk canceller 101 is controlled by control circuit 121, which for example controls which communication lines form the vectored group. As has been explained with respect to FIG. 3, also in the embodiment of FIG. 4 instead of adding communication lines to the vectored group, selected FEXT branches may be added.

The symbols output by crosstalk canceller 101 are further processed in receive circuitry 118, 119, 120 which may for example comprise frequency equalizers or slicers. Similar to FIG. 3 it should be noted that both on the subscriber line 100 and in communication device 101, further elements, for example elements conventionally found in DSL communication systems, may be present which, in order to provide a more concise explanation of features of the embodiments shown, are omitted in FIG. 4.

Similar to what was described with respect to the embodiment of FIG. 3, for determining crosstalk cancellation coefficients and/or for determining which lines to incorporate in the vectored group training symbols are sent from subscriber side 100 to communication device 101, and an error signal e is generated and fed to control circuit 121. Also a weighting vector G which may be identical, but also may be different to weighting vector G of FIG. 3, is fed to control circuit 121.

It should be noted that in a bidirectional communication systems control circuit 44 of FIG. 3 and control circuit 121 of FIG. 4 may be implemented in a common circuit, for example in a common processor. Likewise, crosstalk precompensator 37 and crosstalk canceller 101 may be implemented in the same circuit, which may comprise a processor, like a digital signal processor, which may, but need not be, the same processor as the one implementing control circuits 44 and 121. It should also be noted that in case of bidirectional communication, the elements and features of communication devices 30, 101 may be implemented in a single communication device, for example a single DSLAM.

Furthermore, while in the embodiments of FIGS. 3 and 4, control circuits 44, 121 are shown as part of communication devices 30, 101, the control circuits may also be a further unit external to communication devices 30, 101.

In the following, the operation of control circuits 44, 121 will be described in more detail. In some embodiments, the operation is basically the same both for the downstream and upstream direction and therefore will be explained only once in the following. In other words, the following description applies to embodiments of the downstream direction and embodiments of the upstream direction, and also to bidirectional embodiments. With respect to bidirectional embodiments, it should be noted that the choice for example which communication lines to incorporate into the vectored group may be made separately for the two communication directions, i.e., upstream and downstream, but may also be made jointly, such that the same communication lines are part of the vectored groups in upstream and downstream direction. Also, the transmission power of amplifiers used may be adjusted separately for upstream and downstream direction, but also may be adjusted jointly.

In the following, methods according to embodiments of the present invention will be described which methods may be for example be implemented in crosstalk reduction and transmit power management unit 11 of FIG. 1, in crosstalk reduction and transmit power management unit 21 of FIG. 2 or in control circuit 44, 121 of FIGS. 3 and 4, but which may also be implemented separately therefrom.

According to an embodiment of the present invention, the choice which communication lines or, more generally, which transmission channels or FEXT branches are to be incorporated into a vectored group is made based on the strength of crosstalk between the transmission channels and based on weighting coefficients or weighting factors attributed to the communication lines. In an embodiment which will be discussed next, a DSL system with M communication line is used as an example, wherein on each communication line a number of carriers or frequency channels are used. The amount of data which may be transmitted over each carrier, i.e., the number of bits which may be loaded on a symbol of a carrier, depends on the signal to noise ratio (SNR) of this carrier. The signal to noise ratio $(SNR(k))_i$ for a carrier k of a communication line i according to an embodiment is given by $$(SNR(k))_i = \frac{\langle u(k)_i^2 \rangle \cdot |H_i(k)|^2}{\sum_{\substack{j=1 \\ j \neq i}}^{M} \langle u(k)_j^2 \rangle \cdot |Fext_{ji}(k)|^2 + \langle r(k)_i^2 \rangle} \quad (1a)$$

or $$(SNR(k))_i = \frac{\langle u(k)_i^2 \rangle}{\sum_{\substack{j=1 \\ j \neq i}}^{M} \langle u(k)_j^2 \rangle \cdot \frac{|Fext_{ji}(k)|^2}{|H_i(k)|^2} + \langle r(k)_i^2 \rangle} \quad (1b)$$

In these equations, $Fext_{ji}(k)$ describes the far end crosstalk (FEXT) coupling from line j to line i, $H_i(k)$ describes the so-called line transfer function of line i and $\langle u(k)_i^2 \rangle$ and $\langle r(k)_i^2 \rangle$ represent the variances of transmit symbols $u(k)_i$ and of noise $r(k)_i$ coupled into line i, respectively.

As can be seen, reducing the crosstalk coupling, for example by vectoring or by adjusting transmit powers, increases the signal to noise ratio and therefore the possible throughput on a carrier and consequently also on a corresponding line.

As mentioned above, according to some embodiments of the present invention, the choice which communication lines or FEXT branches to add to the vectored group, i.e., between which lines to cancel crosstalk by crosstalk precompensation in the downstream direction or crosstalk cancellation in the upstream direction, is made based on the strength of crosstalk between the lines. The far end crosstalk power from a line j to line i may be written as $$P\_fext_{ji}(k) = \langle u^2 \rangle \cdot \sum_k \frac{|Fext_{ji}(k)|^2}{|H_i(k)|^2} \quad (2)$$

Furthermore, as mentioned in large transmission systems with a plurality of lines as mentioned previously not all subscribers may have a contract which guarantees them the maximum possible data rate. For example, based on customer needs or charging tariffs, communication lines can be divided into different groups characterized by different target bit rates, for example a high target bit rate and a low target bit rate. In such an embodiment, it may happen that even given the crosstalk, for lines belonging to a group with a low target bit rate this bit rate may be achieved without any crosstalk reduction. Therefore, in such a case, such lines need not be added to the vectored group, i.e., crosstalk to these lines need not be reduced through crosstalk precompensation or crosstalk cancellation.

In an embodiment, to take different target bit rates into account, a weighting vector G is defined which describes the relative target bit rate of the different lines. The component of the vector G are denoted with $g_i$, $g_i$ being the weighting factor or weighting coefficient attributed to line i. As an example, if there are two groups, one with a high target bit rate and one with a low target bit rate, and the low bit rate is half the high bit rate, $g_i$ is set to 1 if line i belongs to the group with a high target bit rate and is set to 0.5 when line i belongs to the group with the low target bit rate.

To determine which FEXT branches to be added to the vectored group, according to an embodiment a weighted FEXT power matrix is calculated according to $$P\_weight_{ji}(k) = P\_fext_{ji}(k) \cdot g_j^\alpha \cdot g_i^\beta \qquad (3)$$

wherein $\alpha$ and $\beta$ are coefficients which will be described below. The components $P\_weight_{ji}(k)$ of this matrix describe the FEXT power coming from line j and coupled into line i weighted by the weighting coefficients.

$g_j^\alpha$ relates to line j and $g_i^\beta$ relates to line i. $\alpha$ and $\beta$ determine how strong the influence of the respective weighting factor $g_j$ and $g_i$ is.

If the relative target bit rates are 0.5 and 1 as in the above example, then according to an embodiment the low bit rate group uses a lower transmit power, for example 3 db lower power corresponding to $\alpha=1$ than the high bit rate group, such that $\alpha$ may be set to 1. However, other values may also be used. On the other hand, crosstalk cancellation or precompensation to lines belonging to the low bit rate group in this case for example needs only to be applied in case of very strong crosstalk, such that $\beta$ may be selected to be greater than 1, for example $\beta=8$. It should be noted that $\alpha$ and $\beta$ are not limited to integer values. Through the selection of a high value of $\beta$, the elements $P\_weight_{ji}(k)$ for line i belonging to the group with low bit rate are made considerably smaller.

Based on the matrix elements determined according to equation (3), the FEXT branches or communication lines which are to be added to the vectored groups are selected. For example, for each line i, the matrix elements $P\_weight_{ji}(k)$ for all carriers k may be summed up, and of all M(M−1) FEXT branches L branches with the highest results may be selected, L being the number of FEXT branches which can be incorporated in the vectored group. L as explained previously may, for example, be limited due to the computation power available. In other embodiments, a specific carrier k may be selected, and the L branches which have the largest values $P\_weight_{ji}(k)$ for this carrier may be added to the vectored group. In still other embodiments, a number of carriers k, for example carriers k having lower frequencies, carriers k having higher frequencies or a number of carriers k being evenly distributed over the whole spectral range used may be added and the result be used for the selection.

After selecting the FEXT branches or communication lines for partial vectoring, i.e., crosstalk cancellation or crosstalk precompensation, optionally, but not necessarily, spectrum balancing may be applied. The spectrum balancing may use the weighting vector G defined above in order to adjust the transmit power. Usable methods are, for example, described in co-pending US application "Method of transmission power control and communication device", U.S. Ser. No. 11/950,283, the whole content of which is incorporated by reference herein for all purposes.

In the following, an example for spectrum balancing which may be applied in embodiments of the present invention will be described in some more detail.

In general, as mentioned previously, the maximum bit rates are a function of the transmission powers of the individual transmission lines, i.e.

$$B = f(P), \qquad (4)$$

wherein $$B = \begin{pmatrix} B_1 \\ \vdots \\ B_M \end{pmatrix} \qquad (5)$$

is a bit rate vector, $$P = \begin{pmatrix} P_1 \\ \vdots \\ P_M \end{pmatrix} \qquad (6)$$

is a transmission power vector

M denotes the number of transmission lines and f is a function. Each component $B_i$ of the bit rate vector corresponds to the maximum bit rate of the respective individual transmission line i, and each component $P_i$ of the transmission power vector corresponds to the transmission power of the respective individual transmission line i.

According to an embodiment of the invention, a method of transmission power adjustment starts with the already defined weighting vector $$G = \begin{pmatrix} g_1 \\ \vdots \\ g_M \end{pmatrix} \qquad (7)$$

According to the embodiment, the transmission powers of the individual transmission lines are then iteratively calculated in such a way that the actual or effective relative bit rate distribution conforms to or approximates the nominal relative bit rate distribution.

In the following, $$P_k = \begin{pmatrix} P_{1,k} \\ \vdots \\ P_{M,k} \end{pmatrix} \qquad (8)$$

denotes the transmission power vector in the k-th iteration step.

From the components of the transmission power vector in the k-th iteration step, the transmission power vector in the (k+1)-th iteration step is calculated according to $$P_{k+1} = \begin{pmatrix} P_{1,k} \cdot K_{1,k} \\ \vdots \\ P_{M,k} \cdot K_{M,k} \end{pmatrix}, \qquad (9)$$

wherein $$K_k \begin{pmatrix} K_{1,k} \\ \vdots \\ K_{M,k} \end{pmatrix} = \begin{pmatrix} s^{-\Delta B_{1,k} \cdot a(k)} \\ \vdots \\ s^{-\Delta B_{M,k} \cdot a(k)} \end{pmatrix} \qquad (10)$$

is a scaling vector calculated on the basis of the bit rate vector $$B_k = \begin{pmatrix} B_{1,k} \\ \vdots \\ B_{M,k} \end{pmatrix} \qquad (11)$$

in the k-th iteration step.

From the bit rate vector and the weight vector, a weighted bit rate vector $$Bg_k = \begin{pmatrix} Bg_{1,k} \\ \vdots \\ Bg_{M,k} \end{pmatrix} = \begin{pmatrix} B_{1,k}/G_1 \\ \vdots \\ B_{M,k}/G_M \end{pmatrix} \qquad (12)$$

is calculated. From the weighted bit rate vector, a difference vector is calculated according to $$\Delta B_k = \begin{pmatrix} \Delta B_{1,k} \\ \vdots \\ \Delta B_{M,k} \end{pmatrix} = \begin{pmatrix} Bg_{1,k} - \min\{Bg_{1,k}, \ldots, Bg_{M,k}\} \\ \vdots \\ Bg_{M,k} - \min\{Bg_{1,k}, \ldots, Bg_{M,k}\} \end{pmatrix}. \qquad (13)$$

The components of the difference vector are used in Equation (7) for calculating the scaling vector. In Equation (7) s and α (k) are selected to be larger than one.

According to an embodiment, s=10. Further, α (k) may be varied depending on the iteration step, i.e. as a function of k. By this means, convergence speed and precision of the iteration process can be adjusted. In other embodiments, other values of s may be selected, and α (k) may have the same value irrespective of the iteration step, e.g. α (k)=1.

Summarizing the above Equations (9)-(13), the components of the transmission power vector in the (k+1)-th iteration step may thus be calculated according to $$P_{i,k+1} = P_{i,k} \cdot s^{-(Bg_{i,k} - \min\{Bg_{1,k}, \ldots, Bg_{M,k}\}) \cdot \alpha(k)}. \qquad (14)$$

Next, the calculated transmission power vector is subjected to a scaling operation according to $$P_k := P_k \cdot \frac{P_{max}}{\max\{P_{1,k}, \ldots, P_{M,k}\}}. \qquad (15)$$

In other words, the components of the scaled transmission power vector may be calculated according to $$P_{i,k} := P_{ik} \cdot \frac{P_{max}}{\max\{P_{0,k}, \ldots, P_{M,k}\}}. \qquad (16)$$

That is to say, the components of the transmission power vector in the k-th iteration step are scaled in such a way that the largest component of the transmission power vector corresponds to a maximum admissible transmission power $P_{max}$ of a transmission line.

On the basis of the scaled transmission power vector, the transmission power control system, for example control circuit 44 of FIG. 3 or control circuit 121 of FIG. 4, calculates transmission power spectral densities of the individual transmission lines and the corresponding maximum achievable bit rate, i.e. the bit rate vector of the next iteration step. For this purpose, an optimization algorithm, such as the waterfilling algorithm, may be applied. The waterfilling algorithm and other types of suitable optimization algorithms will be explained below. This process may be iteratively repeated until the deviation of the resulting relative bit rate distribution from the nominal relative bit rate distribution, i.e. from the weight vector, is below a predefined threshold or a maximum number of iteration steps is reached.

A bit number $R_j$ of the j-th frequency sub-channel, i.e., carrier, of a transmission channel can be written as $$R_j = \log_2\left(1 + \frac{\left(\frac{S}{N}\right)_j}{\Gamma}\right), \qquad (17)$$

$(S/N)_j$ being the signal-to-noise ratio of the j-th frequency sub-channel at the receiver and $\Gamma$ being the signal-to-noise gap parameter. The signal-to-noise gap parameter is selected to be at least 1 dB, typically in a range from 5 dB to 20 dB. In some embodiments, the signal-to-noise gap parameter may be frequency dependent, i.e. a function of the sub-channel index j.

The total bit rate of the transmission channel can be obtained by summing the bit numbers of the frequency sub-channels and by multiplication with the symbol frequency according to $$B = f_T \cdot \sum_j R_j, \qquad (18)$$

$f_T$ being the symbol frequency.

The signal-to-noise ratio at the receiver can be represented by $$\left(\frac{S}{N}\right)_j = \frac{p_j \cdot |H_j|^2}{\Gamma \cdot \sigma_j^2}. \qquad (19)$$

Accordingly, a total bit rate function of the transmission channel can be expressed as $$B = f_T \cdot \sum_j \log_2\left(1 + \frac{p_j \cdot |H_j|^2}{\Gamma \cdot \sigma_j^2}\right), \qquad (20)$$

In the optimization algorithm, the total bit rate function is maximized. This is accomplished with the additional condition that a maximum value of the transmission power is defined according to $$P_{max} = \sum_j p_j. \qquad (21)$$

Maximizing the bit rate function as defined in Equation (20) with the additional condition of Equation (21) results in the above-mentioned waterfilling algorithm. The mathematical details of solving the optimization problem are known in the art and will not be further explained herein.

According to further embodiments of the invention, different optimization algorithms than the waterfilling algorithm may be used for adjusting the transmission power spectral densities.

According to one embodiment of the invention, an optimization algorithm is used in which the bit rate function of equation (20) is simplified to $$B = f_T \cdot \sum_j \log_2\left(\frac{p_j \cdot |H_j|^2}{\Gamma \cdot \sigma_j^2}\right). \quad (22)$$

Maximizing the total bit rate function as given by equation (22) with the additional condition of equation (21) results in an optimization algorithm may be referred to as "simplified waterfilling algorithm".

The result of the simplified waterfilling algorithm is a piecewise constant transmission power spectral density, i.e. all values of $p_j$ are the same or zero. The values of $p_j$ and the number of usable frequency sub-channels are selected in such a way that on the one hand $$\frac{p_j \cdot |H_j|^2}{\sigma_j^2} \geq \Gamma \quad (33)$$

and on the other hand $$p_j = \frac{P_{max}}{N}, \quad (34)$$

N denoting the number of usable frequency sub-channels.

Again, it is refrained from discussing mathematical details of solving the simplified optimization problem, as these are known in the art.

As compared to the waterfilling algorithm, the simplified waterfilling algorithm significantly reduces the computational effort when adjusting the transmission power spectral densities. This is specifically advantageous in a method of transmission power control of multiple transmission channels, e.g. as explained above. In other embodiments, the simplified waterfilling algorithm may also be applied to a single transmission channel or in other methods of adjusting the transmission powers of multiple transmission channels.

In the above embodiments, a weighting vector G was used which reflects relative desired bit rates for various transmission channels, for example various communication lines in xDSL systems. In other embodiments, some elements of such a weighting vector may not be fixedly set in advance, but only be determined e.g. during the initialization of the system. For example, transmission channels may be assigned a variable weight. In such an embodiment, the variable weight may be adjusted such that when intended bit rates for transmission channels having fixed weights are reached, the bit rates for transmission channels with variable weights are maximized. An example for such an embodiment will now be explained with reference to FIG. 5.

Figure 5:
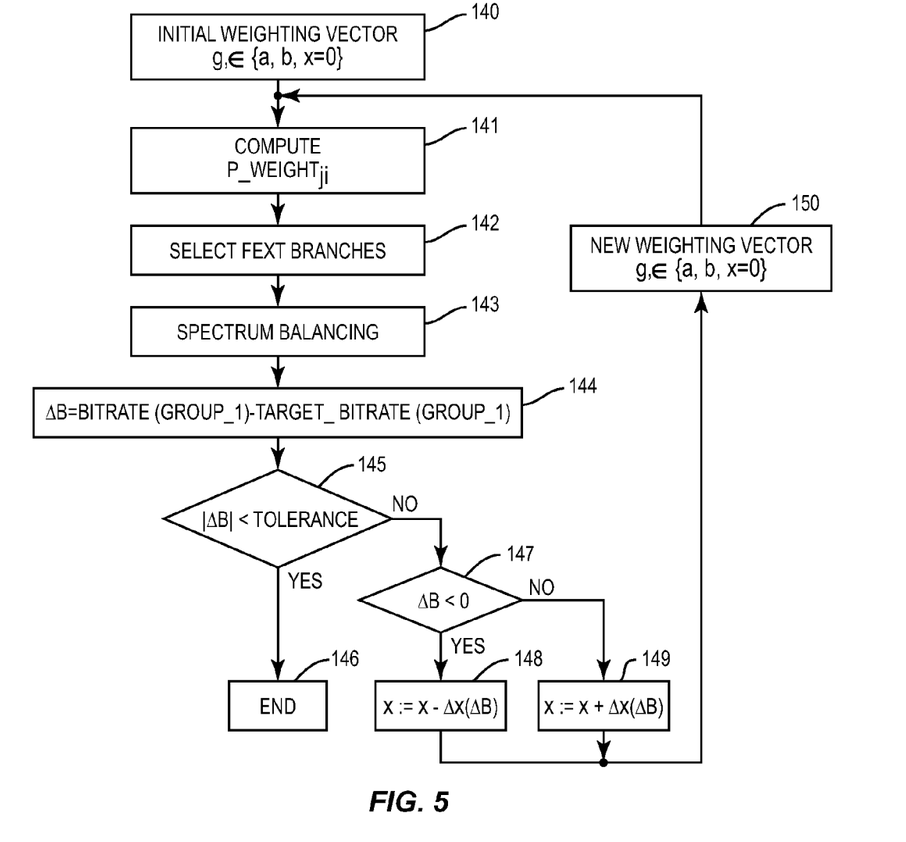
FIG. 5 shows a flow diagram illustrating a method according to an embodiment of the present invention.

In the embodiment of FIG. 5, a plurality of transmission channels is divided into three groups, a first group with a first intended target bit rate, a second group with a second intended target bit rate different from the first target bit rate, and a third group of transmission channels which has no specified target bit rate, but the transmission channels of which should eventually have at least approximately the same bit rate.

At 140, an initial weighting vector G with weighting factors $g_i$ for each transmission channel is defined. $g_i$ may be either a, b or x, wherein a is the weighting factor for the transmission channel of the first group, b is the weighing factor for the transmission channels of the second group and x is the weighting factor for the transmission channels of the third group. x is initially set to 0 and a and b are chosen such that the ratio a/b corresponds to the ratio between the first bit rate and the second bit rate. For example, if the first bit rate is twice the second bit rate, a may be set to 1 and b may be set to 0.5.

At 141, the values $P\_weight_{ij}$ are determined as defined by equation (3).

At 142, the FEXT branches to be added to a vectored group are selected based on the values calculated at 141, for example as already described. As an example, for M transmission channels M(M−1) FEXT branches exist, and of these M(M−1) branches L branches may be added to the vectored group in a particular implementation.

At 143, a spectrum balancing, i.e., an adjustment of transmission powers for the various transmission channels, for example as described above, is performed. It is to be noted that the spectrum balancing at 143 is optional, and may be omitted in other embodiments.

With the crosstalk reduction determined at 142 and the spectrum balancing performed at 143, at 144 the bit rate achieved for one of the groups, for example the group with the highest bit rate (labeled group_1 in FIG. 6) is determined, and from this value the target bit rate, i.e., the intended bit rate, for this group is subtracted to calculate a bit rate difference ΔB. In other embodiments, such a bit rate difference may be calculated for more than one group. At 145, it is checked if the absolute value of ΔB is smaller than a predetermined tolerance value. The predetermined tolerance value indicates how exact the target bit rate should be reached. For example, the tolerance value may be 10% of the target bit rate, 5% of the target bit rate or 1% of the target bit rate, although other values are equally possible.

If the absolute value of ΔB is smaller than the tolerance value, at 146 the procedure is ended since this indicates that the bit rates have been adjusted with sufficient accuracy. If this is not the case, at 147 it is checked if ΔB is smaller than 0. ΔB<0 means that the actual bit rate is smaller than the target bit rate. If this is the case, at 148 the weighting value x is reduced by a value Δx which is depending on ΔB. For example, Δx may correspond to ΔB multiplied by a predetermined factor.

Figure 6:
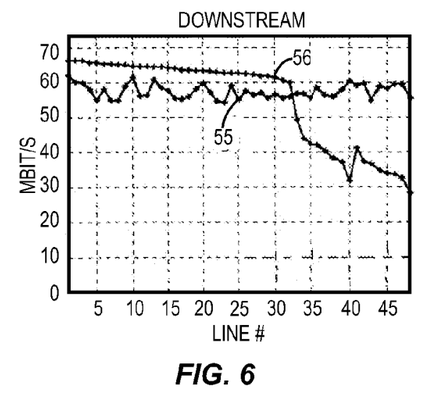
FIGS. 6 to 11 show simulation results for illustrating the effects of some embodiments of the present invention.

In an embodiment, at a first iteration step of the method shown in FIG. 6, i.e., in the first run of the operation described so far, the method may be terminated if ΔB<0 since in this case, i.e., in the first iteration, x=0 and therefore cannot be further reduced. This indicates that with the intended distribution of the transmission channels to the first group, second group and third group the target bit rate(s) may not be reached. In an embodiment, in such a case the target bit rate(s) may be reduced and the method shown may be started anew at 140, and/or some transmission channels may be assigned to a different group corresponding to a lower bit rate. For example, if the first bit rate is twice the second bit rate, some transmission channels may be moved from the first group to the second group, and then the method may be started again at 140.

If, on the other hand, at 147 it turns out that ΔB>0, this means that the actual bit rate is higher than the target bit rate. This, in turn, means that the actual bit rate of the first group and the second group may be lowered while still obtaining the target bit rate, and the bit rate of the third group may be increased. Consequently, in this case at 149 x is increased by a value Δx depending on ΔB, for example corresponding to ΔB multiplied by a predetermined factor.

Corresponding to the new values for x calculated at 148 or 149, at 150 a new weighting vector is defined with the weights for the transmission channels of the first group set to the new value of x, and then the method is continued again at 141 with the new values.

With a method as described with respect to FIG. 6, bit rates of the first group and the second group may be set to the intended values, and the bit rates of the transmission channels of the first group may be set to a third uniform value. It should be noted that the use of three groups of transmission channels in the above explanation is only an example and any arbitrary number of groups may be used. For example, five groups may be used, where three of the groups have fixed assigned weighting factors, for example 1, 0.7 and 0.3, and the two other groups may have variable weighting factors having a predetermined relationship with each other, for example 2x and x. Any other desired values are also possible. It is to be noted that the embodiment discussed with reference to FIG. 5 may be employed both for the upstream direction and the downstream direction, for example may be implemented in control circuit 44 of the embodiment of FIG. 3 or control circuit 121 of the embodiment of FIG. 4.

In the following, the operation of the embodiment discussed with reference to FIG. 5 will be further illustrated using simulation results. As an example for a communication system, a DSL system as for example shown in the embodiments of FIGS. 3 and 4 is used. In particular, as a central office equipment for this example a VDSL-2 line card supporting 48 communication line which are all contained in one cable binder, wherein no other lines are present in this cable line which may disturb these lines, is used. A white noise signal of −140 dBm/Hz is assumed to disturb all lines. The lengths of the communication lines are equally distributed in the range of 400 to 450 m. The cable binder for this simulation is assumed to be of the type AWG26, and the so-called MIMO crosstalk channel model is used for modeling far end crosstalk. The maximum used frequency range is 12 MHz for all communication lines.

In the simulation example, partial crosstalk cancellation or partial crosstalk precompensation is assumed for basically eliminating crosstalk of 16×15=240 FEXT branches, i.e., for 16 lines added to the vectored group, out of 48×47=2256 branches. For the stimulation example, as in the embodiment of FIG. 5 three groups of communication lines are re-defined. For the first group, a target bit rate of 65 Megabit per second (MBit/s) for the downstream direction and 35 Mbit/s for the upstream direction is selected. For the second group, a target bit rate of 32.5 Mbit/s for the downstream direction and 17.5 Mbit/s for the upstream direction is defined. In other words, the target bit rate for the second group is half the target bit rate for the first group both in the downstream direction and in the upstream direction. For the third group no fixed target bit rate is defined, corresponding to a variable weighting factor as described with reference to FIG. 5, but all communication lines associated with the third group should get the same maximum bit rate both in the upstream direction and in the downstream direction. This bit rate for the communication lines of the third group should be determined such that the target bit rates for the first group and the second group are provided.

In the simulation example, 32 randomly selected communication lines are allocated to the first group, eight randomly selected communication lines are allocated to the second group, and the remaining eight communication lines are associated with the third group. Therefore, as also mentioned in an example with respect to FIG. 5 above, for the simulation the components of the weighting factor G assigned to the first group are set to 1, the components assigned to the second group are set to 0.5 and the components assigned to the third group are set to a variable x, which is set to 0 as an initial value.

With this system, methods as described with respect to FIG. 5 are performed.

Figure 7:
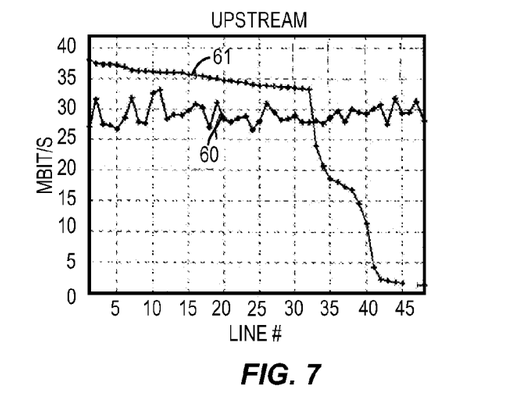

FIGS. 6 and 7 show simulation results in the downstream and upstream direction, respectively, with the method as discussed with respect to FIG. 5 applied wherein the spectrum balancing at 143 has been omitted. In other words, in FIGS. 6 and 7 the situation is shown where only partial crosstalk cancellation or precompensation, but no spectrum balancing is applied.

In FIGS. 6 and 7, the achieved data rate in megabits per second is plotted over the line number. A curve 55 as a reference shows a distribution of maximum bit rate reached for the various lines with the use of partial crosstalk cancellation, but without taking the grouping into consideration, which for example would correspond to a weighting vector where all weighting factors are equal. As can be seen, in this case the maximum bit rates for all lines is in the same range, but no lines reach the target bit rate for the first group.

Curve 56 shows the maximum bit rates with partial crosstalk cancellation and the grouping taking into account, i.e., a weighting vector with three weighting factors 1, 0.5 and x as a variable weight is used. In the graph, the lines are arranged according to their group, and within their groups are sorted according to their bit rate to make the graphs easier to comprehend. In other words, for curve 56 line 1 to 32 belong to the first group, lines 33 to 40 belong to the second group and lines 41 to 48 belong to the third group. As can be seen, through the use of grouping the bit rates of the lines of the first group are increased compared with the situation without grouping, and all exceed 60 Mbit/s.

Similar to FIG. 6, in FIG. 7 a curve 60 shows the bit rates with partial crosstalk cancellation, but without the grouping taken into account, and curve 61 shows the maximum bit rates with partial crosstalk concentration and grouping taking into account by using the corresponding weighting vector. The arrangement of lines for curve 61 corresponds to one explained for curve 56. Also in this case, through the use of a weighting vector higher bit rates can be obtained for the lines of the first group.

Figure 8:
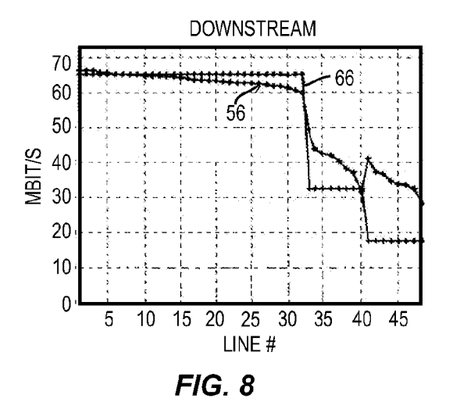
Figure 9:
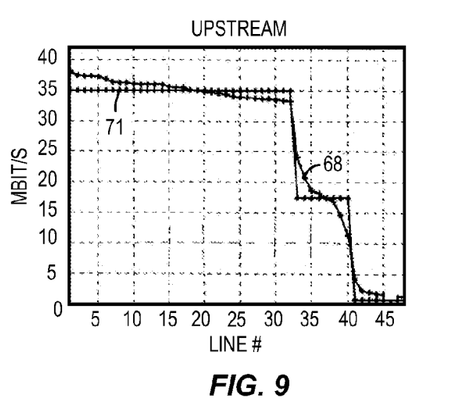

In FIG. 8 for the downstream direction, curve 56 of FIG. 6 is shown again as a reference and in FIG. 9 for the upstream direction curve 61 of FIG. 7 is shown again. Additionally, curves are shown which show the reachable bit rates with an embodiment which uses both partial crosstalk cancellation or precompensation and spectrum balancing taking the grouping, i.e., the weighting vector, into account. In FIG. 8, curve 66 shows the obtainable bit rates in such an embodiment, and in FIG. 9 curve 71 shows the obtainable bit rates for such an embodiment. The first 32 lines again are the lines of the first group, the next eight lines the lines of the second group and the last eight lines the lines of the third group. As can be seen, in the simulation example with partial crosstalk precompensation or cancellation and spectrum balancing, both the lines of the first group and the lines of the second group are adjusted to their target bit rate, and the lines of the third group all have the same maximum bit rate. In the example shown, the maximum bit rate for the third group are 17.6 Mbit per second in the downstream direction and 0.75 Mbit per second in the upstream direction. In an embodiment, if these bit rates for the third group are too low, for example are below a predetermined value, predefined network or system parameters like the distribution of lines to the first group and the second group and/or the target bit rates for the first group and the second group may be changed.

Figure 10:
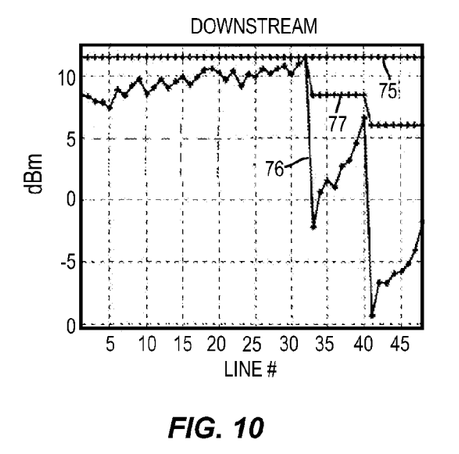
Figure 11:
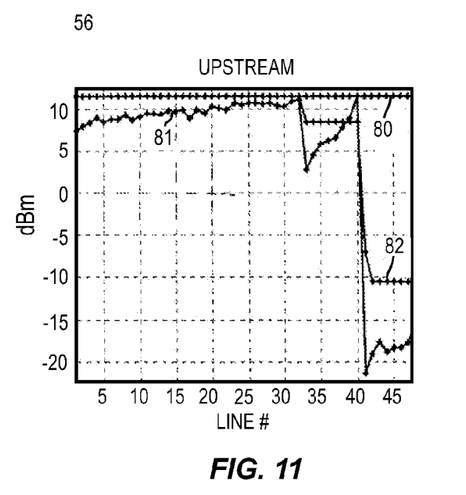

In FIGS. 10 and 11, the transmit power for all users is shown. FIG. 10 shows the transmit powers for the downstream direction, and FIG. 11 shows the transmit powers for the upstream direction.

Curve 75 in FIG. 10 and curve 80 in FIG. 11 show a case where for all lines a maximum transmit power of 11.5 dBm is used. In this case, no crosstalk reduction and no spectrum balancing is applied. Therefore, curve 75 and 80 may serve as reference curves.

Curve 77 in FIG. 10 and curve 82 in FIG. 11 show an example for transmit powers with partial crosstalk cancellation or precompensation when taking the grouping, i.e., the weighting vector, into account. Lines 1 to 32 again belong to the first group, lines 33 to 40 to the second group and lines 41 to 48 to the third group. In this case, only for the lines of the first group the maximum transmit power is used, and the lines of the second and third group have reduced transmit powers. Curves 77 and 82 therefore correspond to the situation represented by curve 56 and 61, respectively, in FIGS. 6 to 9.

Curve 76 in FIG. 10 and curve 81 in FIG. 11 show an example for transmit powers with partial crosstalk precompensation or cancellation and spectrum balancing under consideration of the grouping. Curves 76 and 81 therefore correspond to the situation of curves 66 and 71 of FIGS. 8 and 9, respectively.

With spectrum balancing the overall transmit power may be reduced in such an embodiment, thus reducing power consumption and non-linear distortion.

It should be noted that the above described embodiment and simulation examples serve only for illustrating some possibilities for implementing the present invention and are not to be construed as limiting. For example, the numerical values and number of groups given in the simulation examples of FIGS. 6 to 11 serve only for illustrating some features of some embodiments of the present invention. The scope of the present application is to be construed as limited only by the appended claims and equivalents thereof.

What is claimed is:

1. A communication device, comprising:
communication circuitry configured to communicate via a plurality of transmission channels, wherein said communication circuitry comprises crosstalk reduction circuitry to reduce crosstalk for a part of said plurality of transmission channels by joint processing of data of said part of said transmission channels,
wherein said part is selected from said plurality of transmission channels depending on a grouping of said transmission channels into at least two groups,
wherein each of said at least two groups is assigned a target bit rate, and
wherein the target bit rate for different groups differ.

2. The communication device of claim 1, wherein said target bit rates comprises at least one fixed target bit rate and at least one variable target bit rate.

3. The communication device of claim 1, wherein said communication device is configured to select said part depending on a weighting vector describing relative target bit rates of the plurality of transmission channels.

4. The communication device of claim 1 further comprising:
transmission power control circuitry configured to control transmission power on said plurality of transmission channels depending on said grouping.

5. The communication device of claim 1, wherein said communication device is configured to select said part of said plurality of transmission channels depending on crosstalk strengths between said plurality of transmission channels.

6. The communication device of claim 1, wherein said plurality of transmission channels are a plurality of xDSL communication lines.

7. A communication device comprising:
a plurality of outputs to couple with a plurality of communication lines grouped into at least two groups,
a plurality of symbol mappers, each symbol mapper being associated with a respective output and configured to map data to be transmitted over the respective communication lines to a data symbol,
a crosstalk precompensator configured to combine data symbols generated by a part of said symbol mappers to generate crosstalk precompensated data symbols for a part of said plurality of communication lines associated with said part of said symbol mappers, and
a control circuit configured to select said part of communication lines depending on crosstalk strength between said communication lines and weighting factors associated with said plurality of communication lines, and
wherein each of said at least two groups of communication lines is assigned a target bit rate, the target bit rate differing for different groups.

8. The communication device of claim 7, wherein said control circuit is configured to select said part of communication lines as communication lines associated with crosstalk branches which have the highest crosstalk strength weighted with weighting factors of the communication lines associated with the crosstalk branch.

9. The communication device of claim 8, wherein on each of said plurality of communication lines data is transmitted on a plurality of carriers, wherein a weighted crosstalk strength $P\_weight_{ji}(k)$ for a carrier k of a crosstalk branch from a communication line j to a communication line is calculated according to $$P\_weight_{ji}(k) = P\_fext_{ji}(k) \cdot g_j^\alpha \cdot g_i^\beta$$

wherein $P\_fext_{ji}(k)$ is the crosstalk power from communication line j to communication line i for carrier k, $g_j$ is the weighting factor for line j, $g_i$ is the weighting factor associated with line i and $\alpha$ and $\beta$ are predetermined values,
and wherein the control circuit is configured to select said part of said communication lines depending on said weighted crosstalk strengths.

10. The communication device of claim 9, wherein $\beta > 1$.

11. The communication device of claim 7, wherein said control circuit is further configured to control an output power for each of said communication lines depending of said weighting factors.

12. The communication device of claim 11, wherein said weighting factors represent relative bit rates, and wherein said transmission powers are adjusted such that transmission rates obtained on said plurality of communication lines match the relative bit rates.

13. A communication device, comprising:
a plurality of inputs to be coupled with a respective plurality of communication lines grouped into at least two groups, receive circuitry configured to obtain receive symbols based on data received via each of said plurality of communication lines,
a crosstalk canceller configured to combine receive symbols received via a part of said communication lines to generate crosstalk cancelled receive symbols, and
a control circuit configured to select said part of said communication line depending on a crosstalk strength between said communication lines and weight factors associated with said plurality of communication lines, and
wherein each of said at least two groups of communication lines is assigned a target bit rate, the target bit rate differing for different groups.

14. The communication device of claim 13, wherein said control circuit is configured to select said part of communication lines as communication lines associated with crosstalk branches which have the highest crosstalk strength weighted with weighting factors of the communication lines associated with the crosstalk branch.

15. The communication device of claim 14, wherein the communication device is configured to transmit on each of said plurality of communication lines data on a plurality of carriers, wherein a weighted crosstalk strength $P\_weight_{ji}(k)$ for a carrier k of a crosstalk branch from a communication line j to a communication line i is calculated according to $$P\_weight_{ji}(k) = P\_fext_{ji}(k) \cdot g_j^\alpha \cdot g_i^\beta$$

wherein $P\_fext_{ji}(k)$ is the crosstalk power from communication line j to communication line i for carrier k, $g_j$ is the weighting factor for line j, $g_i$ is the weighting factor associated with line i and $\alpha$ and $\beta$ are predetermined values,
and wherein the control circuit is configured to select said part of said communication lines depending on said weighted crosstalk strengths.

16. The communication system of claim 15, wherein $\beta > 1$.

17. The communication device of claim 13, wherein said control circuit is further configured to control transmit powers of signals received on said inputs depending of said weighting factors by controlling further communication devices connected to far ends of said communication lines.

18. The communication device of claim 13, wherein said weighting factors represent relative bit rates, and wherein said transmission powers are adjusted such that transmission rates obtained on said plurality of communication lines match the relative bit rates.

19. A method comprising:
defining weighting factors for a plurality of transmission channels grouped into at least two groups,
determining crosstalk strength between said plurality of transmission channels,
selecting a part of the plurality of transmission channels depending on said crosstalk strength and depending on said weighting factors for crosstalk reduction, and
communicating data via said plurality of transmission channels using crosstalk reduction for that part of said plurality of transmission channels, and
wherein to each of said at least two groups of transmission channels a target bit rate is assigned, wherein the target bit rate for different groups differ.

20. The method of claim 19, wherein said weighting factors indicate the target bit rates assigned for said plurality of communication channels.

21. The method of claim 19, wherein said weighting factors comprise at least one fixed weighting factor and at least one variable weighting factor.

22. The method of claim 21, further comprising adjusting said variable weighting factor such that bit rate ratios defined by said at least one fixed weighting factor are fulfilled.

23. The method of claim 19, further comprising performing a spectrum balancing for said plurality of transmission channels depending on said weighting factors.

24. A method, comprising:
adjusting bit rates for a plurality of transmission channels grouped into at least two groups based on weighting factors associated with the plurality of transmission channels, wherein said adjusting bit rates comprises a partial vectoring, wherein to each of said at least two groups of transmission channels a target bit rate is assigned, and wherein the target bit rate for different groups differ.

25. A communication device, comprising:
communication circuitry configured to communicate via a plurality of transmission channels, wherein said communication circuitry comprises crosstalk reduction circuitry configured to reduce crosstalk for a part of far end crosstalk (FEXT) branches between different ones of said plurality of transmission channels by joint processing of data of said part of said FEXT branches,
wherein said part of said FEXT branches is selected from said FEXT branches depending on a grouping of said transmission channels into at least two groups,
wherein each of said at least two groups is assigned a target bit rate, and
wherein the target bit rate for different groups differ.

* * * * *